United States Patent [19]
Ono et al.

[11] Patent Number: 5,224,142
[45] Date of Patent: Jun. 29, 1993

[54] ROTARY-ANODE TYPE X-RAY TUBE

[75] Inventors: Katsuhiro Ono, Utsunomiya; Hidero Anno; Hiroyuki Sugiura, both of Ootawara; Takayuki Kitami, Tochigi, all of Japan

[73] Assignee: Kabushiki Kaisha Toshiba, Kawasaki, Japan

[21] Appl. No.: 766,276

[22] Filed: Sep. 27, 1991

[30] Foreign Application Priority Data

Jan. 31, 1991 [JP] Japan .................................. 3-11260

[51] Int. Cl.⁵ ............................................. H01J 35/10
[52] U.S. Cl. ................................. 378/128; 378/127; 378/131; 378/132
[58] Field of Search ............... 378/119, 121, 125, 127, 378/128, 131, 132, 144

[56] References Cited

U.S. PATENT DOCUMENTS

| | | |
|---|---|---|
| 3,828,217 | 8/1974 | Ebersberger ........................ 378/128 |
| 4,210,371 | 7/1980 | Gerkema et al. . |
| 4,413,355 | 11/1983 | Matsumoto . |
| 4,644,577 | 2/1987 | Gerkema et al. . |

FOREIGN PATENT DOCUMENTS

| | | |
|---|---|---|
| 0141476 | 5/1985 | European Pat. Off. . |
| 0351225 | 1/1990 | European Pat. Off. . |
| 55-3180 | 1/1980 | Japan . |
| 0078449 | 6/1980 | Japan ................................. 378/128 |
| 2-144836 | 6/1990 | Japan . |

Primary Examiner—David P. Porta
Attorney, Agent, or Firm—Cushman, Darby & Cushman

[57] ABSTRACT

A rotary-anode X-ray tube having a rotor, a stationary shaft, and a sliding bearing connecting the rotor and the stationary shaft, forming a gap filled with liquid metal lubricant. The rotor has a first rotary member supporting an anode target and a second rotary member at which a sliding bearing is installed and which is coaxial with the first rotary member. The first and the second rotary members are connected at that end of the heat conductive path which is remote from the anode target. A heat insulating gap is formed at all fitting portions, but the remote end. Therefore, the temperature rise of the sliding bearing is controlled without using refregerant, and stable rotation of the bearing is secured.

21 Claims, 4 Drawing Sheets

ROTARY-ANODE TYPE X-RAY TUBE

BACKGROUND OF THE INVENTION

1. Field of the Invention

The present invention relates to a rotary-anode type X-ray tube, more particularly to improvement of the rotary structure for rotating an anode target.

2. Description of the Related Art

As is known, in a rotary-anode X-ray tube, a disk-like anode target is supported by a rotary structure and a stationary structure. The rotary structure is connected to the stationary structure by a bearing portion. An electron beam emitted from a cathode is applied to the anode target while the anode target is rotated at a high speed by energizing an electromagnetic coil arranged outside a vacuum envelope, thus irradiating X rays. The bearing portion is constituted by a rolling bearing such as a ball bearing or a hydrodynamic pressure type sliding bearing which has bearing surfaces with spiral groove on the bearing surface and uses a metal lubricant consisting of, for example, gallium (Ga) or gallium-indium (Ga-In-Sn) alloy, which is liquefied during an operation. The rotary-anode type X-ray tubes using the sliding bearing are disclosed in, for example, Published Examined Japanese Patent Application No. 60-21463 and Published Unexamined Japanese Patent Application Nos. 60-97536, 60-113817, S60-117531, S61-2914, and S62-287555.

The rotor assembly includes a rotary shaft supporting the anode target and made of a metal having a high melting point, a cylindrical inner core functioning as a rotor of a motor, fixed to the rotary shaft, and made of a ferromagnetic material such as iron, and an outer cylinder made of a material having a high electric conductivity such as copper. The inner core is fitted in the outer cylinder and brazed to the outer cylinder A stationary shaft is inserted into the rotary cylinder. A bearing connects the stationary shaft and the rotary cylinder. In the rotor assembly, the rotor is rotated at a high speed, according the theory of an induction motor, when a rotating magnetic field is applied to the rotor from a stator outside the tube.

When the sliding bearing is filled with liquid metal used as lubricant, there is the advantage that the bearing surface is hardly abraded and rotational noises are hardly produced. However, in the X-ray tube, the following problems occur. While the X-ray tube operates, the rotor cylinder supporting the anode target is heated due to the heat transmitted from the target. Therefore, the hydrodynamic pressure type sliding bearing is also heated. Thus, when the bearing is filled with liquid metal, various problems may occur. For example, the rotational performance of the bearing is degraded due to a change of the bearing gap distance, and the liquid metal reacts on the bearing material because it is active. Therefore, as disclosed in the above-identified patent applications, the above problem can be solved by forcibly cooling the sliding bearing with circulating coolant. To this end, the X-ray tube apparatus must have coolant circulating paths and a coolant circulation system. Thus, the system can be use only for a special equipment because it is not compatible with the conventional X-ray tube.

SUMMARY OF THE INVENTION

It is an object of the present invention to provide a rotary-anode type X-ray tube having stable rotational performance and capable of controlling the temperature of the sliding bearing without using coolant.

According to the invention, there is provided a rotary-anode X-ray tube comprising:

an anode target;

a rotor structure which has one end supporting the anode target and another end, and includes a first rotary member connected to the anode target, a second rotary member arranged coaxially with the first rotary member, and means for thermally insulating the first rotary member from the second rotary member;

a stationary structure holding the rotor and allowing the rotor structure to rotate; and a hydrodynamic bearing formed between the rotary structure and to the stationary structure and having a gap containing a metal lubricant which is in liquid state during rotation of the rotary structure.

Additional object and advantage of the invention will be set forth in the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The following is the description of an embodiment of the rotary anode type X-ray tube according to the present invention.

Figure 1:
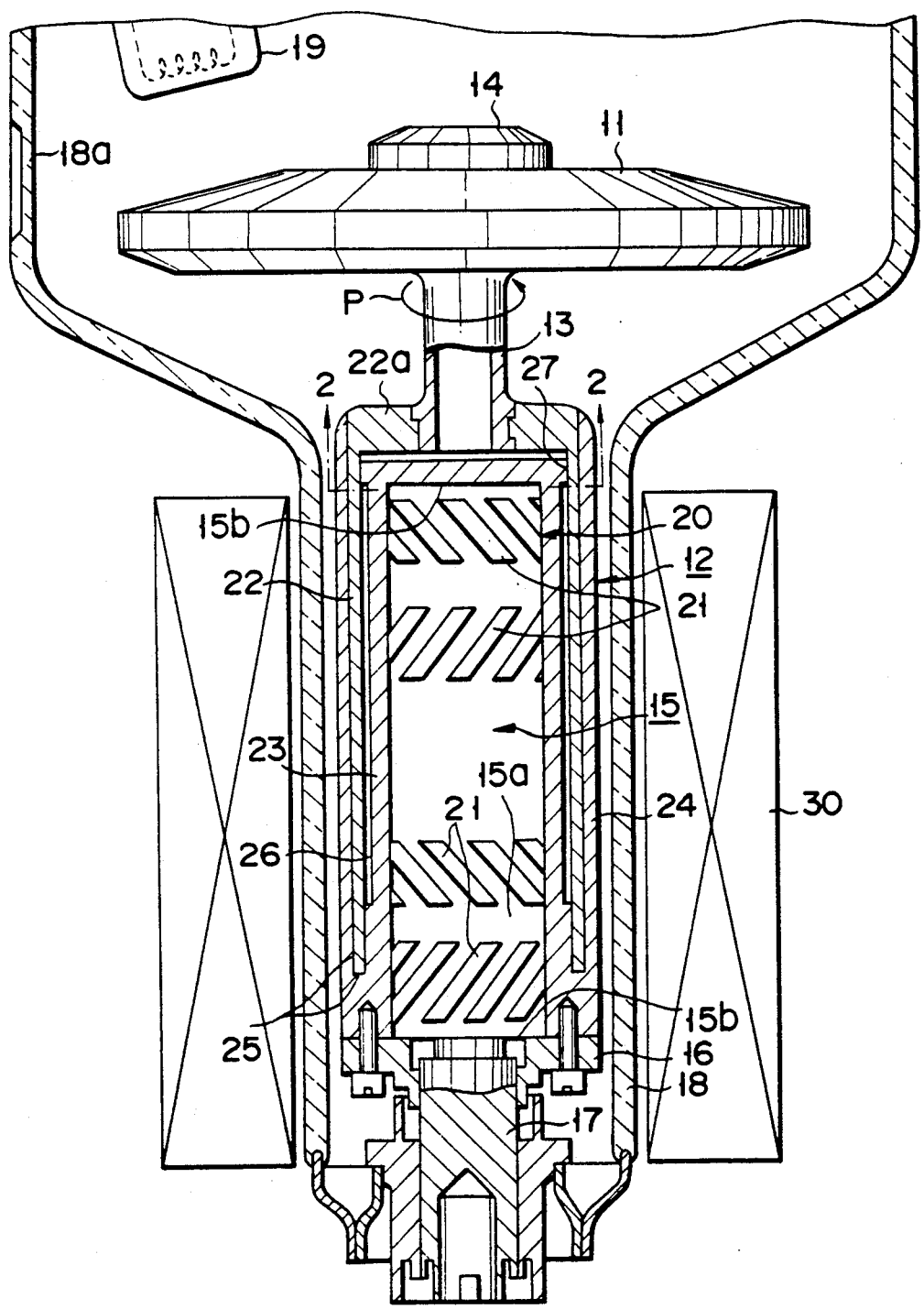
FIG. 1 is a longitudinal sectional view showing a rotary anode type X-ray tube according to an embodiment of the present invention.
Figure 2:
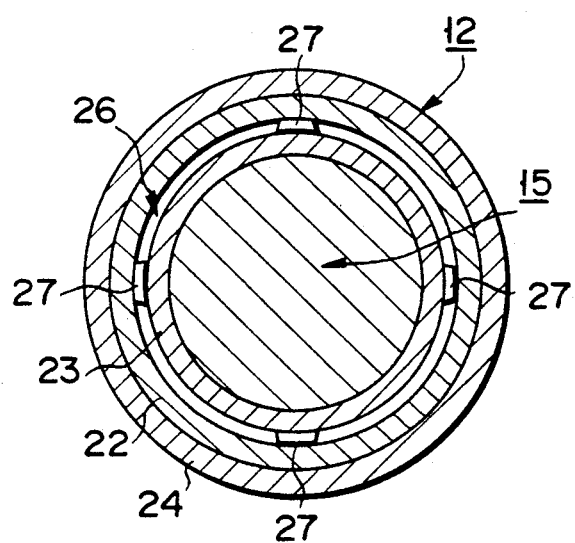
FIG. 2 is an enlarged transverse sectional view along the line 2—2 in FIG. 1.

FIGS. 1 and 2 show an embodiment of the rotary anode type X-ray tube according to the present invention. As shown in FIGS. 1 and 2, a disk-like anode target 11 made of heavy metal is secured to a rotary shaft 13 which is fixed to one end of a cylindrical rotor assembly 12 by a securing screw 14. A cylindrical stationary shaft 15 is fitted into the cylindrical rotor assembly 12. A ring block 16 is secured at the opening section of the rotor assembly 12 to seal the inner space the fixed shaft 15 is air.-tightly connected to a glass vacuum envelope 18. The vacuum envelope 18 has an X-ray emitting window 18a. The X rays irradiated from the anode target 11 can pass through the window 18a. A cathode assembly 19 for radiating an electron beam is installed in the vacuum envelope 18 and faces the anode target 11. A hydrodynamic pressure type sliding bearing 20 is provided between the rotor assembly 12 and the stationary shaft 15. Spiral grooves of herringbone pattern are formed in the outer peripheral surface 15a of the stationary shaft 15, constituting radial bearing. Spiral grooves of the same pattern are formed in the both end faces of the stationary shaft 15, constituting a thrust bearing. The rotor assembly 12 has flat and smooth inner surfaces opposing the outer peripheral surface 15a and the end faces of the stationary shaft 15. Spiral grooves can be formed in the inner surfaces of the rotary 12.

The bearings have a gap of approx. 20 μm, between the bearing surfaces of the rotor assembly 12 and stationary shaft 15. The gap and spiral groove are filled with liquid metal lubricant (not shown) such as a gallium-indium-tin (Ga-In-Sn) alloy. The lubricant is liquified by the heat produced during a rotating operation. A stator 30 having electromagnetic coils surrounds the rotor assembly 12, outside the vacuum envelope 18. A rotating magnetic field is generated by the stator 30. The rotary anode 11 is rotated by the rotating magnetic field at a high speed in the direction of arrow P. The electron beam emitted from the cathode assembly 19 is applied to the anode target 11, which emits X rays. In the X-ray tube, the anode target 11 also generates heat. The most of the heat is dissipated by radiation. The remaining heat is transmitted to the bearing 20 through the rotor assembly 12 and dissipated to the outside of the tube from the mounting portion 17 through the fixed shaft 15.

In the rotor assembly 12, the rotary shaft 13 made of a metal having a high melting point, such as molybdenum (Mo), is fixed to a first cylindrical rotary member 22 made of an iron. A second cylindrical rotary member 23 having a bearing surface and made of a material such as tungsten (W) or molybdenum (Mo), either being a metal hardly reacting with the liquid metal lubricant, is coaxially fitted into the first rotary member 22 having the bearing gap. The first cylindrical rotary member 22 is fitted in an outermost cylindrical member 24 made of copper. The first rotary member 22 and outermost cylindrical member 24 are brazed each other, and the first rotary member 22 and the second rotary member 23 are also brazed each other at the end portions 2 remote from the anode target 11, so that the unit rotary assembly 12 is formed. A heat-insulating gap 26 extending along the axis is formed between the first rotary member 22 and second rotary member 23. When the outside diameter of the rotor 12 is approx. 38 mm, the gap 26 is about 0.5 mm. Four small projections 27 are formed on the peripheral end surface of the second rotary member 23 at an interval of 90° around the axis. These projections 27 are set in contact with the inner surface of the first rotary member 22, keeping the coaxial arrangement of the first and second rotary members 22 and 23 and applying a mechanical stability to the rotary assembly. The contact area between the small projections 27 and the first rotary member 22 is small, and the resistance to heat transfer is large, minimizing the heat transfer. The ring block 16 is secured to the opening portion of the second rotary member 23 by a plurality of screws.

While the X-ray tube operates, the heat produced by the anode target 11 is transferred to the first rotary member 22 and conducted to the second rotary member 23 through the small projections 27. However, since the portion has a large heat resistance, the heat is conducted mainly to the second rotary member 23 through the brazed portion 25 and the stationary shaft 15 through the sliding bearing gap 20. In the structure described above, the brazed portion is sufficiently remote from the anode target 11. Thus, the heat conductive path is relatively long, extending from the anode target 11 to the brazed portion 25. The first rotary member 22 is made of a material having a small heat conductivity. Hence, the heat conductive path has a large heat resistance. Therefore, the temperature rise in the bearing is minimized. Even if thermal expansion differs among rotary members, each member can independently expand and contract because the portions of the members, other than the brazed portion, are only mechanically fitted to each other. Therefore, the stress resulting from thermal expansion difference does not concentrate on a particular portion, and stable operation is maintained. The temperature in the sliding bearing 20 is lower by approx. 130° C. the temperature of a bearing in the X-ray structure having no gap between the first and second rotary members. Thus, the gap distance of the dynamicpressure-type sliding bearing is changed at only a small, the reaction with the bearing material is controlled even if active liquid metal lubricant is used. The resonance frequency of the rotor can therefore be increased to, for example, 200 Hz or more, and a structure standing high-speed rotation can be obtained.

Figure 3:
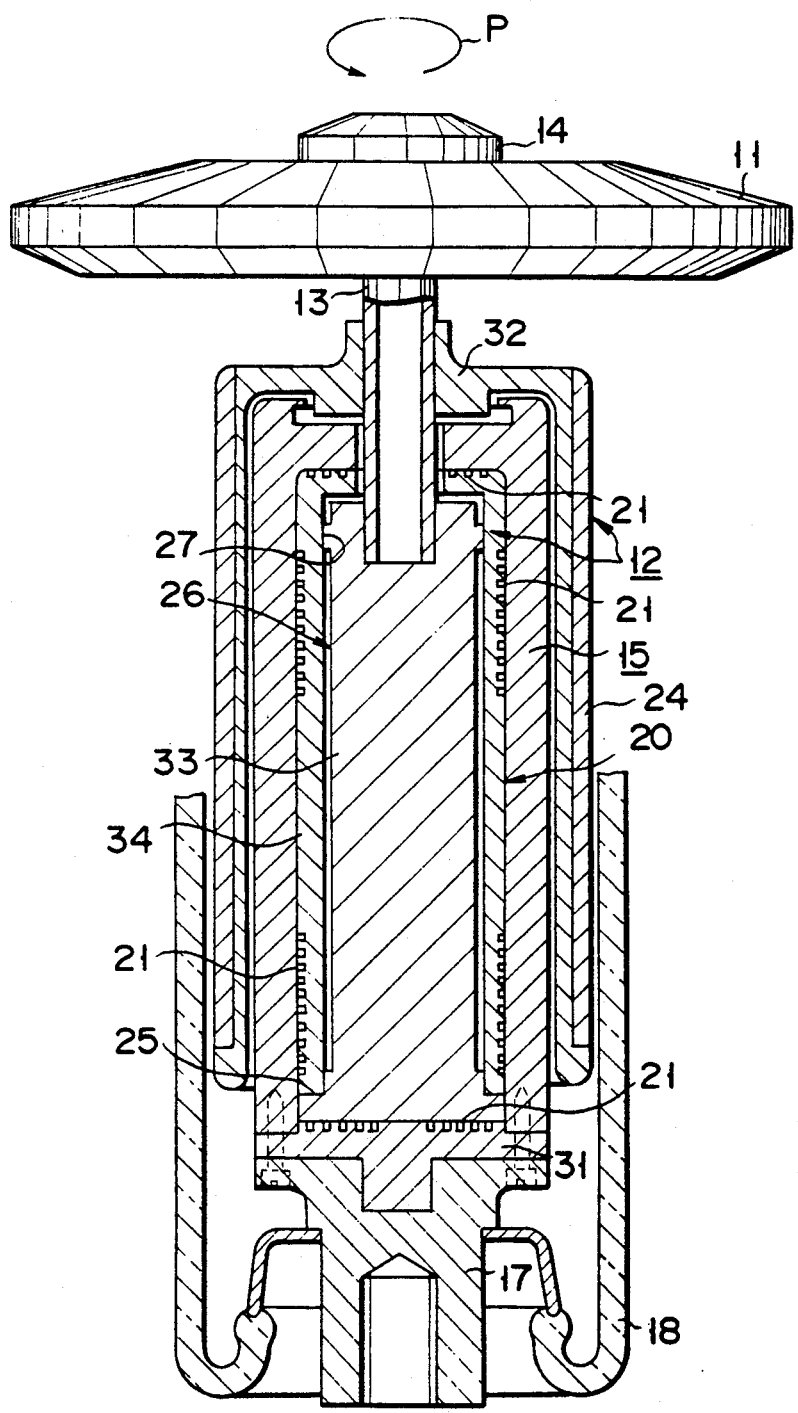
FIG. 3 is a longitudinal sectional view showing a rotary anode type X-ray tube according another embodiment of the present invention.

In the embodiment shown in FIG. 3, a cylindrical rotor 12 is installed at the center, which rotates together with the anode target 11, and a cylindrical fixed shaft 15 surrounds the rotor 12. The one end of the fixed shaft 15 has a cylindrical hole. A rotary shaft 13 passes through this hole. The opening portion is closed by a disk block 31. The fixed shaft 15 and block 31 are secured to an anode support 17 by a plurality of screws. Spiral grooves 21 are formed in the block 31 contacting the end face of the rotor 12. Moreover, a ferromagnetic cylinder 32, functioning as the rotor of a motor, and an outermost cylinder 24 made of copper fitted to the outside of the cylinder 32 are arranged on the outer periphery of the fixed shaft 15. The rotary shaft 13 is mechanically and securely fixed to the cylinder 32.

In the X-ray tube as described above, the rotary shaft 13 supporting the anode target 11 is secured to the first cylindrical rotary member 33 and the cylindrical second rotary member 34, which is coaxially fitted to the first rotary member 33 and whose outer surface and serves as a sliding bearing surface, is installed on the outer periphery of the first rotary member 33. The first rotary member 33 and the second rotary member 34 are connected at that end of the heat conducting path which is remote from the anode target 11. That is, they are integrated with the brazed portion 25 at the thermally remote end. A heat insulating gap 26, extending in the axial direction, is formed between the first cylindrical portion 22 and the second cylindrical portion 23. Four small projections 27 are formed at the one end of the first rotary member 33, which contacts the inside of the second rotary member 34 and thus maintaining mechanically-stable coaxial fitting state. The outer periphery surface and the end faces of the second rotary member 34 compose bearing surfaces of the hydrodynamic pressure type sliding bearing, since herringbone-pattern spiral grooves 21 are formed in these surfaces. Thus, the heat conducting path from the anode target to the sliding bearing surface has a large heat resistance.

It is recommended that the heat insulating gap 26 ranges from 0.1 to 1 mm in the radius direction.

Figure 4:
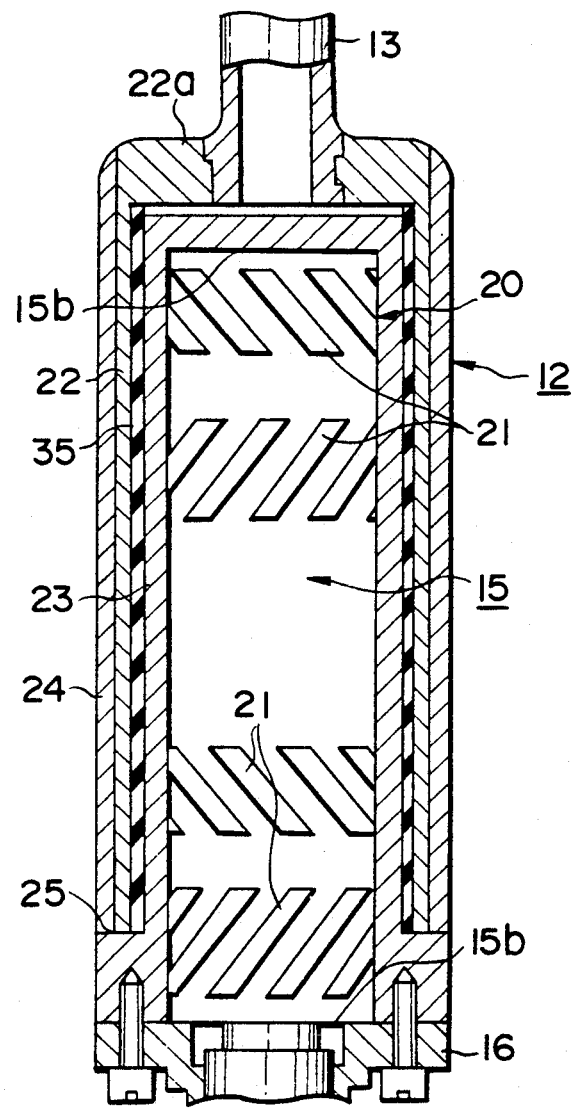
FIG. 4 is a longitudinal sectional view showing a rotary anode type X-ray tube according to another embodiment of the present invention.

In a X-ray tube shown in FIG. 4 having a similar structure as that shown in FIG. 1, a heat insulating cylinder 35 made of a heat insulating material having a low heat conductivity, such as a ceramic, is interposed between the first and second rotary members 22 and 23. The first and second rotary members 22 and 23 are brazed together at a portion 25 remote from the anode target 11 in a same manner as in shown in FIG. 1. The heat insulating cylinder can be so formed as to coat a heat insulating material on the inner surface of the first rotary member 22 or on the outer surface of the second rotary member 23.

As described above, the present invention makes it possible to suppress the temperature rise of the bearing. Therefore, the gap of the sliding bearing surface hardly changes, the reaction between active liquid metal and bearing material is prevented, and stable sliding-bearing rotational performance is maintained for a long time.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A rotary-anode X-ray tube comprising;
   an anode target;
   a rotor structure which has one end supporting said anode target and another end, and includes a first rotary member connected to said anode target, a second rotary member arranged coaxially with said first rotary member, a means for maintaining alignment of said first and second members, and means for thermally insulating said first rotary member from said second rotary member including a heat insulating gap formed between said first and second rotary members;
   a stationary structure for rotatably holding said rotor structure; and
   a hydrodynamic bearing formed between said rotor structure and said stationary structure and having a gap containing a metal lubricant which is in liquid state during rotation of said rotor structure.

2. A rotary-anode X-ray tube of claim 1, wherein said first rotary member and said second rotary member are connected at the other end of the rotor structure.

3. A rotary-anode X-ray tube of claim 1, wherein said stationary structure is columnar and rotatably inserted in said rotor structure.

4. An X-ray tube according to claim 1, wherein said stationary shaft has an outer surface, said rotor structure has an inner surface, and said hydrodynamic bearing has spiral grooves formed in at least one of the outer surface of said stationary shaft and the inner surface of said rotor structure.

5. An X-ray tube according to claim 1, wherein said rotor structure is columnar and inserted in said stationary structure.

6. An X-ray tube according to claim 5, wherein said rotor structure has an outer surface, said stationary structure has an inner surface, and said hydrodynamic bearing has spiral grooves formed n at least one of the outer surface of said stationary structure and the inner surface of said rotor structure.

7. A rotary-anode X-ray tube according to claim 1, wherein the first rotary member is made of ferromagnetic metal, and the second rotary member has a surface contacting the lubricant and is made of material inactive on liquid lubricant.

8. A rotary-anode X-ray tube comprising:
   an anode target;
   a rotor structure which has one end supporting said anode target and another end, and includes a first rotary member connected to said anode target, a second rotary member arranged coaxially with said first rotary member, a means of maintaining the alignment and stability of said first and second rotary members which includes projections formed on the second rotary member which contact said first rotary member, and a means for thermally insulating said first rotary member from said second rotary member;
   a stationary structure holding said rotor structure and allowing said rotor structure to rotate; and
   a hydrodynamic bearing formed between said rotor structure and said stationary structure and having a gap containing a metal lubricant which is in liquid state during rotation of said rotor structure.

9. A rotary-anode X-ray tube of claim 8, wherein said first rotary member and said second rotary member are connected at the other end of the rotor structure.

10. A rotary-anode X-ray tube of claim 8, wherein said stationary structure is columnar and rotatably inserted in said rotor structure.

11. An X-ray tube according to claim 8, wherein said stationary shaft has an outer surface, said rotor structure has an inner surface, and said hydrodynamic bearing has spiral grooves formed in at least one of the outer surface of said stationary shaft and the inner surface of said rotor structure.

12. An X-ray tube according to claim 8, wherein said rotor structure is columnar and inserted in said stationary structure.

13. An X-ray tube according to claim 12, wherein said rotor structure has an outer surface, said stationary structure has an inner surface, and said hydrodynamic bearing has spiral grooves formed on at least one of the outer surface of said stationary structure and the inner surface of said rotor structure.

14. A rotary-anode X-ray tube according to claim 8, wherein the first rotary member is made of ferromagnetic metal, and the second rotary member has a surface contacting the lubricant and is made of material inactive on liquid lubricant.

15. A rotary-anode X-ray tube comprising:
    an anode target;
    a rotor structure which has one end supporting said anode target and another end, and includes a first rotary member connected to said anode target, a second rotary member arranged coaxially with said first rotary member, a means for maintaining alignment of said first and second members, and means for thermally insulating said first rotary member from said second rotary member including a heat insulating layer formed between said first and second rotary members;
    a stationary structure holding said rotor structure and allowing said rotor structure to rotate; and
    a hydrodynamic bearing formed between said rotor structure and said stationary structure and having a gap containing a metal lubricant which is in liquid state during rotation of said rotor structure.

16. A rotary-anode X-ray tube of claim 15, wherein said first rotary member and said second rotary member are connected at the other end of the rotor structure.

17. A rotary-anode X-ray tube of claim 15, wherein said stationary structure is columnar and rotatably inserted in said rotor structure.

18. An X-ray tube according to claim 15, wherein said stationary shaft has an outer surface, said rotor structure has an inner surface, and said hydrodynamic bearing has spiral grooves formed in at least one of the outer surface of said stationary shaft and the inner surface of said rotor structure.

19. An X-ray tube according to claim 15, wherein said rotor structure is columnar and inserted in said stationary structure.

20. An X-ray tube according to claim 19, wherein said rotor structure has an outer surface, said stationary structure has an inner surface, and said hydrodynamic bearing has spiral grooves formed on at least one of the outer surface of said stationary structure and the inner surface of said rotor structure.

21. A rotary-anode X-ray tube according to claim 15, wherein the first rotary member is made of ferromagnetic metal, and the second rotary member has a surface contacting the lubricant and is made of material inactive on liquid lubricant.

* * * * *